July 27, 1937.  M. SOVDE  2,088,069
COOKY MOLD
Filed Oct. 7, 1936
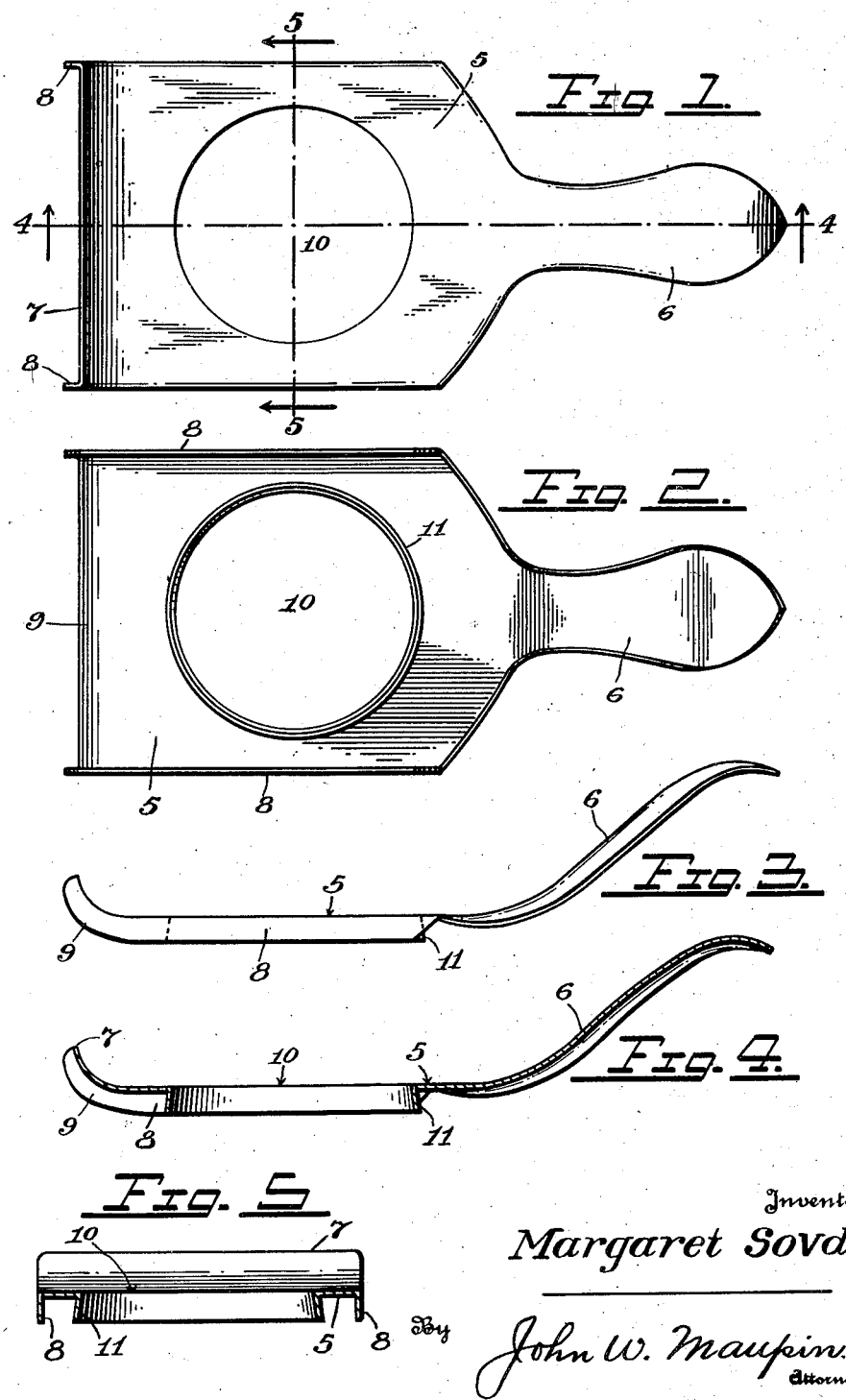
Inventor
Margaret Sovde
By John W. Maupin.
Attorney Patented July 27, 1937

2,088,069

UNITED STATES PATENT OFFICE 2,088,069

COOKY MOLD

Margaret Sovde, Seattle, Wash.

Application October 7, 1936, Serial No. 104,371

2 Claims. (Cl. 107—19)

My invention relates to cooky molds and certain objects of the invention are to provide a mold which may be manufactured at small cost, and by means of which cookies are formed with ease and rapidity. Another object is to provide means whereby the surplus dough material is readily removed and saved for use, thus keeping the device clean and free of loose dough. And a further object is to provide means whereby the cookies are readily freed from the mold and thus deposited upon a cooking utensil.

In the drawing:

Figure 1 is a top plan view of a cooky mold constructed substantially in accordance with my invention;

Fig. 2 is a bottom plan view of the same;

Fig. 3 is a view in side elevation;

Fig. 4 is a view in longitudinal vertical section taken on a broken line 4—4 of Fig. 1; and Fig. 5 is a view in transverse vertical section taken on a broken line 5—5 of Fig. 1.

Referring in detail to the drawing wherein like reference numerals indicate like parts in the several views, the numeral 5 designates the flat body portion of the mold. Said body portion is preferably, though not necessarily, rectangular in shape and is provided at one end with a raised handle 6. The outer edges of the handle are curved downward to easily fit the hand as will be understood. The other end of the body portion is curved upward to form a raised lip 7.

Each lateral edge portion of the body 5 is bent or deflected downward to form equal depending side flanges 8. The bottom edges of these side flanges are preferably parallel to the said body portion, and their outer ends curve upward in conformity with the curved end of said body adjacent the lip 7 as shown at 9. A relatively large opening 10 is centrally provided in the body 5, and the metal portion surrounding said opening is bent downward to form a depending flange 11. This flange is flared outward from the body to form a distended edge and this edge is in the same plane with the bottom edges of the side flanges 8 as clearly shown in Fig. 5.

In the use of the device, same is placed upon a cooky sheet or pan on which the cookies are baked with the bottom edges of the flanges 8 and 11 seated thereon. The handle 6 is held in one hand while the cooky dough material is placed in the space defined by the opening 10 and flange 11 with a spatula held in the other hand. The dough material is then pressed down and its top is smoothed over by drawing the spatula across the body portion 5 toward the lip 7. Any surplus dough is carried along by the spatula and is removed therefrom by drawing the spatula across the lip whereby the dough is scraped off. It will thus be seen that the device provides means whereby all surplus dough may be salvaged and the top of the body 5 may be kept clean and free of loose dough.

After the cooky is thus formed in the mold, the handle 6 is raised while keeping the forward curved end portions 9 of the depending side flanges 8 in contact with the cooky sheet or pan. Owing to the flared flange 11 and, above all, to the upwardly curved ends 9 of the flanges 8, the cooky remains upon the sheet or pan when the handle end of the device is raised. These curved flange ends provide a shifting fulcrum whereby a torque movement is imparted to the mold when it is raised thus more readily freeing the edges of the cooky from the flange 11 and leaving it deposited upon the cooking utensil.

The foregoing described operation is repeated for each cooky as they are deposited side by side upon the cooking utensil until same is completely filled and the cookies are then ready for baking in the oven. The work of completely filling the cooking utensil may be done with ease and rapidity. The entire device is made from a single piece of thin sheet metal and may be manufactured at a very small cost. While I have shown a mold for making circular cookies, it will be expressly understood that the opening 10 and flange 11 may be made in various shapes or forms and, in fact, it is my intention to provide a plurality of different forms for the market.

I claim:

1. A cooky mold comprising a flat body portion having an opening therethrough, a flared flange extending downward from said opening, a raised handle formed on one end of the body, a raised lip formed on the other end of the body, a flange extending downward from each side of the body, and the bottom edges of said flanges disposed in the same plane with the bottom edge of the flared flange.

2. A cooky mold comprising a flat body portion having an opening therethrough, a flared flange extending downward from said opening, a raised handle formed on one end of the body, a raised lip formed by curving the other end of the body upward, a flange extending downward from each side of the body, the bottom edges of said flanges disposed in the same plane with the bottom edge of the flared flange, and the ends of said side flanges curved upward adjacent the raised lip.

MARGARET SOVDE.